(12) United States Patent
Elvin-Jensen (10) Patent No.: US 10,299,504 B2
(45) Date of Patent: May 28, 2019

(54) BIN FOR FOOD DRYER

(71) Applicant: InterCrate Container Corp., West Vancouver (CA)

(72) Inventor: Justin Elvin-Jensen, West Vancouver (CA)

(73) Assignee: Intercrate Container Corp., North Vancouver (CA)

( * ) Notice: Subject to any disclaimer, the term of this patent is extended or adjusted under 35 U.S.C. 154(b) by 314 days.

(21) Appl. No.: 15/267,701

(22) Filed: Sep. 16, 2016

(65) Prior Publication Data
US 2018/0077962 A1    Mar. 22, 2018

(51) Int. Cl.
| | |
|---|---|
| *B04B 7/16* | (2006.01) |
| *B04B 7/18* | (2006.01) |
| *F26B 5/08* | (2006.01) |
| *A23N 12/08* | (2006.01) |
| *A47J 43/24* | (2006.01) |
| *B65D 25/30* | (2006.01) |
| *F26B 25/16* | (2006.01) |
| *F26B 25/18* | (2006.01) |

(52) U.S. Cl.
CPC ............ *A23N 12/086* (2013.01); *A47J 43/24* (2013.01); *B04B 7/16* (2013.01); *B65D 25/30* (2013.01); *F26B 5/08* (2013.01); *F26B 25/16* (2013.01); *F26B 25/18* (2013.01); *B04B 7/18* (2013.01)

(58) Field of Classification Search
CPC . A23N 12/086; B04B 7/16; F26B 5/08; F26B 25/16
USPC .......................................................... 34/201
See application file for complete search history.

(56) References Cited

U.S. PATENT DOCUMENTS

| | | | | |
|---|---|---|---|---|
| 2,784,500 | A * | 3/1957 | Beaumont ............... | D06F 37/12 34/58 |
| 3,691,645 | A * | 9/1972 | Nethersell ............. | D06F 49/003 192/136 |
| 4,090,310 | A * | 5/1978 | Koff ..................... | A23N 12/086 210/360.1 |
| 4,189,850 | A * | 2/1980 | Dieterich ................. | A23B 7/02 210/380.1 |
| 4,412,390 | A * | 11/1983 | Grant .................... | D06F 49/003 188/166 |
| 4,435,964 | A * | 3/1984 | Misawa .................. | A47L 23/02 15/33 |

(Continued)

FOREIGN PATENT DOCUMENTS

| | | | | |
|---|---|---|---|---|
| CA | 2252689 A1 | * | 8/1999 | ........... A23N 12/086 |
| JP | 3197710 U | * | 6/2015 | ............. D06F 58/08 |

*Primary Examiner* — Stephen M Gravini
(74) *Attorney, Agent, or Firm* — Smiths IP; Lawrence Chan (57) ABSTRACT

A removable bin for a dryer comprises a substantially circular floor portion and a wall portion. The wall portion comprises an upper portion and a lower portion. The lower portion comprises a plurality of zones arranged along a height of the lower portion and extending along a perimeter of the lower portion. Each zone defines a respective area of the lower portion. Each of the zones comprises a number of openings for drainage, and each zone has a respective density of openings. Each of the openings is defined by one or more circumferential edges, with the circumferential edges being molded. The respective density of openings in each of the zones increases towards the bottom of the bin.

22 Claims, 8 Drawing Sheets

(56) References Cited

U.S. PATENT DOCUMENTS

| | | | | |
|---|---|---|---|---|
| 4,691,448 A * | 9/1987 | Alstetter | B01J 8/382 | 34/314 |
| 5,230,281 A * | 7/1993 | Wireman | F26B 17/107 | 34/58 |
| 5,490,453 A * | 2/1996 | Mackay | A47J 19/027 | 210/360.1 |
| 5,601,712 A * | 2/1997 | Adams | B01D 33/067 | 210/297 |
| 5,638,606 A * | 6/1997 | Bryan | F26B 5/08 | 34/147 |
| 5,675,905 A * | 10/1997 | Hougham | F26B 5/08 | 210/361 |
| 5,718,130 A * | 2/1998 | Kim | D06F 25/00 | 68/183 |
| 5,953,939 A * | 9/1999 | Guerrero-Parra | D06F 23/04 | 68/23.2 |
| 7,028,415 B2 * | 4/2006 | Heinzen | F26B 5/08 | 34/312 |
| 7,111,546 B2 * | 9/2006 | Siegel | A47J 43/24 | 34/194 |
| 7,866,259 B2 * | 1/2011 | Zaghloul | A47J 37/1271 | 210/360.1 |
| 7,975,948 B2 * | 7/2011 | Holcomb | A47J 42/04 | 241/169.1 |
| 8,234,795 B2 * | 8/2012 | Dull | F26B 11/181 | 34/128 |
| 8,353,244 B2 * | 1/2013 | Wong | A47J 43/24 | 426/443 |
| 8,893,613 B2 * | 11/2014 | Oropeza | F26B 5/08 | 99/495 |
| 9,556,553 B2 * | 1/2017 | Liu | D06F 58/08 | |
| 2003/0115913 A1 * | 6/2003 | Lee | D06F 17/06 | 68/23.3 |
| 2003/0201646 A1 * | 10/2003 | Kaploun | H02K 7/183 | 290/54 |
| 2003/0233765 A1 * | 12/2003 | Heinzen | F26B 5/08 | 34/321 |
| 2010/0180460 A1 * | 7/2010 | Tang | A47L 13/254 | 34/58 |
| 2013/0298783 A1 * | 11/2013 | Oropeza | F26B 5/08 | 99/501 |
| 2015/0075023 A1 * | 3/2015 | So | A23L 1/015 | 34/58 |
| 2015/0233044 A1 * | 8/2015 | Liu | D06F 58/08 | 24/108 |
| 2018/0077962 A1 * | 3/2018 | Elvin-Jensen | A23N 12/086 | |
| 2018/0231309 A1 * | 8/2018 | Oropeza | F26B 5/08 | |

\* cited by examiner

BIN FOR FOOD DRYER

FIELD OF THE INVENTION

The invention relates to bins, and in particular, to removable bins for use with centrifugal spin dryers.

BACKGROUND OF THE INVENTION

Centrifugal spin dryers are commonly used in the agriculture industry to dry vegetables such as lettuce and cabbage. One such dryer is the SD50 Spin Dryer made by Heinzen Manufacturing International. The SD50 Spin Dryer accepts a removable bin loaded with produce (e.g. lettuce, cabbage, etc.) and spins the produce at high speeds (by rotating the bin) in order to remove excess water. The dryer comprises a cavity to accommodate the removable bin, with the bin typically positioned at an angle from vertical when inserted into the dryer and with the open end of the bin generally facing upwards. A number of openings are also formed through the walls of the bin.

When the dryer initially rotates the bin (e.g. at around 50 rpm), the produce itself is generally forced through centrifugal force to the perimeter of the bin. As the dryer increases its rotational speed (e.g. to up to 200 rpm) water on the produce is forced outward and downward (through centrifugal force and gravity) from the produce. This water escapes from the bin through the openings. When the dryer stops, the resulting produce is dryer and can be unloaded for further processing or transport.

The bins currently used are typically made from conventional garbage or other all-purpose bins that have had multiple holes manually drilled through their walls. This is a tedious process requiring significant manpower and time. In addition, the holes are often drilled in a haphazard manner. For example, if too few holes are drilled, this could result in bins that suffer inconsistent or reduced effectiveness in draining the excess water. On the other hand, if too many holes are drilled, then the structural integrity of the bin may be compromised.

There is therefore a need for a removable bin that is both structurally sound and yet exhibits good water draining capabilities.

SUMMARY OF THE INVENTION

According to one embodiment of the invention, a removable bin for a dryer comprises a substantially circular floor portion and a wall portion. The wall portion comprises first and second ends, with the first end defining a bin opening and the second end being connected to the floor portion. The wall portion also comprises an upper portion extending from the first end and a lower portion extending between the upper portion and the second end. The lower portion comprises a plurality of zones arranged along a height of the lower portion and extending along a perimeter of the lower portion. Each zone defines a respective area of the lower portion. Each of the zones comprises a number of openings for drainage, and each zone has a respective density of openings defined as the number of openings in the zone per the respective area. Each of the openings is defined by one or more circumferential edges, with the circumferential edges being molded. The respective density of openings in each of the zones increases towards the second end.

In another embodiment, the wall portion is tapered from the first end to the second end.

In yet another embodiment, the upper portion comprises an upper wall and a lip extending away from the upper wall.

In still yet another embodiment, the upper portion further comprises one or more lip cross-ribs extending radially away from the upper wall, with the lip cross-ribs being attached to the lip.

In a further embodiment, the upper portion further comprises one or more handles, with each of the handles comprising a handle opening and one or more handle walls extending away from the upper wall. The one or more handle walls define at least a portion of the handle opening.

In still a further embodiment, the lip defines at least another portion of the handle opening.

In yet a further embodiment, the one or more handle walls define an entirety of the handle opening.

In another embodiment, the lip extends away from the upper wall a first distance and the one or more handle walls extend away from the upper wall a second distance. The first distance is greater than or equal to the second distance.

In still another embodiment, the upper portion further comprises handle support ribs extending away from the upper wall and located proximate to the handle opening.

In yet another embodiment, the upper portion further comprises handle support walls extending away from the upper wall, with each handle support wall being attached to at least one of the handle support ribs.

In still yet another embodiment, the lower portion comprises three zones.

In a further embodiment, the lower portion comprises a band extending along the perimeter of the lower portion and extending for a portion of the height of the lower portion, with the band being free of the openings.

In still a further embodiment, the floor portion comprises a base and a rounded corner portion extending between the base and the lower portion.

In still yet a further embodiment, the base comprises an outer portion and an inner floor, with the inner floor being substantially surrounded by the outer portion.

In another embodiment, the outer portion comprises two or more base handles and two or more outer floors, with each of the outer floors extending between two of the base handles.

In yet another embodiment, at least one of the outer floors comprises outer floor openings for drainage.

In still another embodiment, the base handles comprise one or more base handle walls to define one or more recesses.

In still yet another embodiment, the inner floor is vertically offset from the outer portion.

In a further embodiment, the base further comprises one or more ledges extending between the outer floors and the inner floor.

In still a further embodiment, the base further comprises a ridge extending inwardly from one or more ledges.

In yet a further embodiment, the base further comprises one or more ledge ribs attached to one or more ledges.

In still yet a further embodiment, the inner floor comprises one or more inner floor openings for drainage.

The foregoing was intended as a summary only and of only some of the aspects of the invention. It was not intended to define the limits or requirements of the invention. Other aspects of the invention will be appreciated by reference to the detailed description of the preferred embodiments. Moreover, this summary should be read as though the claims were incorporated herein for completeness.

BRIEF DESCRIPTION OF THE DRAWINGS

The preferred embodiment of the invention will be described by reference to the drawings thereof, in which.

DETAILED DESCRIPTION

Figure 1:
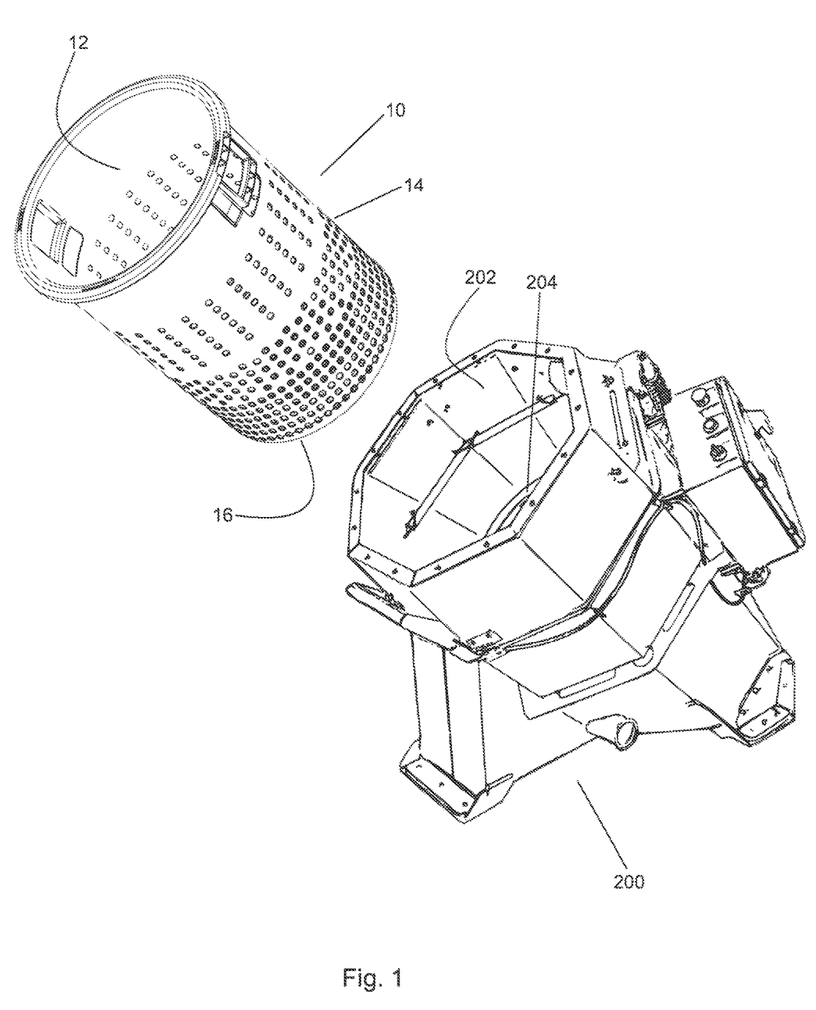
FIG. 1 shows an exploded view of a conventional food dryer with a removable bin in accordance with the invention.

Referring to FIG. 1, a conventional food dryer 200 (such as the SD50 Spin Dryer model manufactured by Heinzen Manufacturing Limited) comprises a cavity 202 that accommodates a removable bin 10 in accordance with the present invention. The removable bin 10 may be loaded with various contents, including produce (e.g. lettuce and cabbage). Once the removable bin 10 is loaded into the cavity 202, the food dryer 200 rotates the removable bin 10 at high speeds to remove excess water from the produce.

Figure 7:
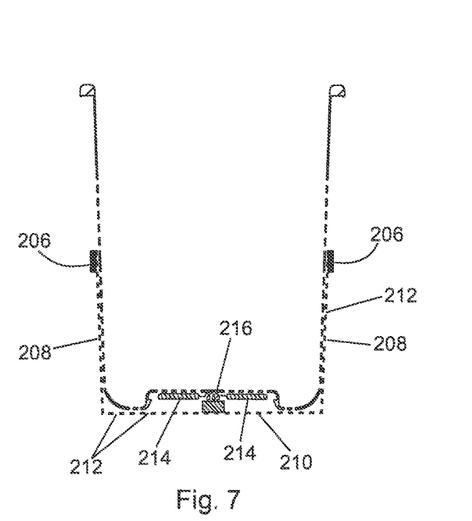
FIG. 7 shows the partial cross-sectional view of FIG. 6 along with the metal basket of the food dryer.

Referring to FIGS. 1 and 7, the cavity 202 is formed, at least in part, by a metal basket 204 within the food dryer 200. The metal basket 204 has a basket rim 206, one or more basket walls 208, and a basket floor 210, as best seen in FIG. 7 (the metal basket 204 is shown in cross-section). When the removable bin 10 is loaded into the cavity 202, the basket rim 206 generally comes into contact with the removable bin 10. A plurality of basket openings 212 is formed on the basket walls 208 and the basket floor 210.

Figure 2:
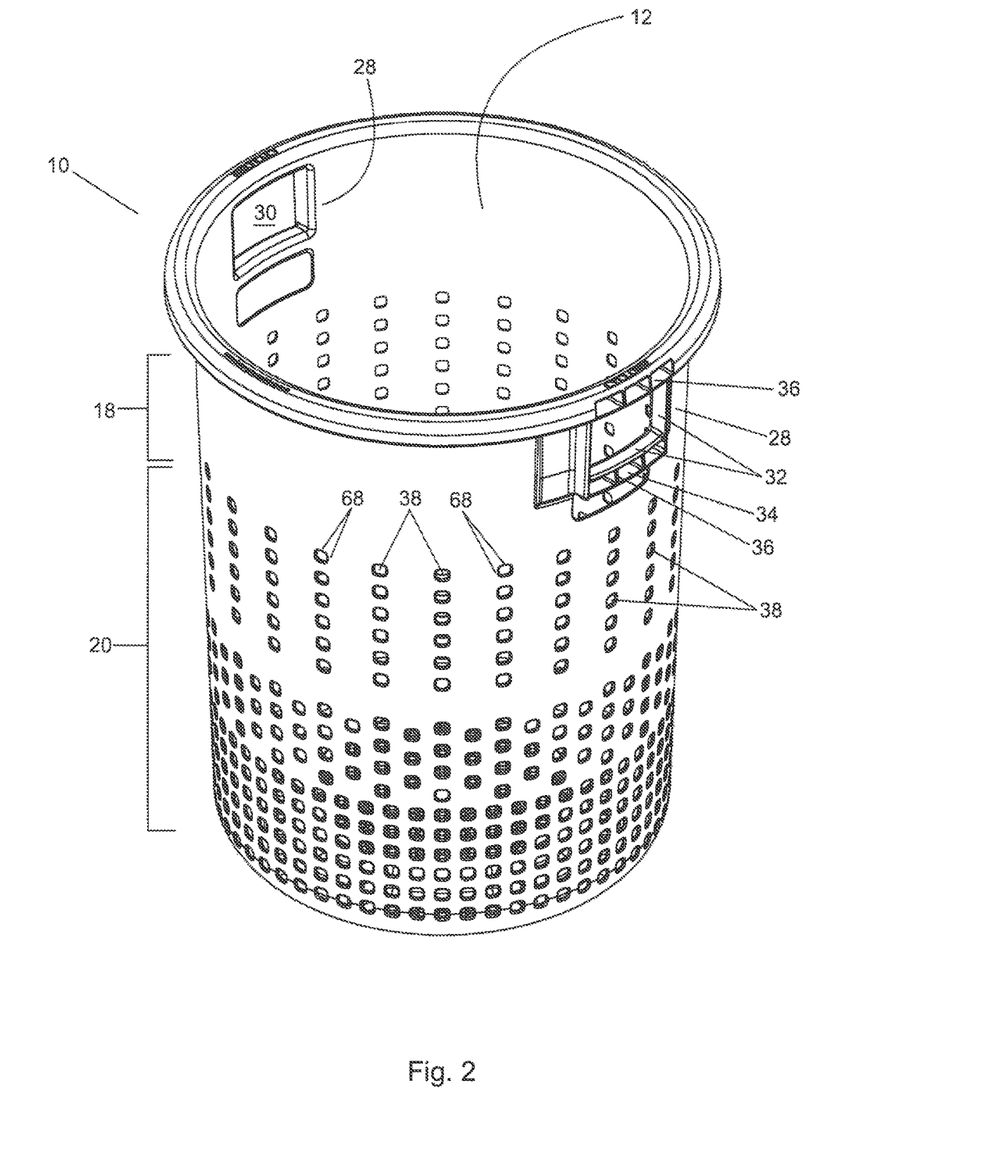
FIG. 2 shows a top perspective view of a removable bin in accordance with the invention.
Figure 3:
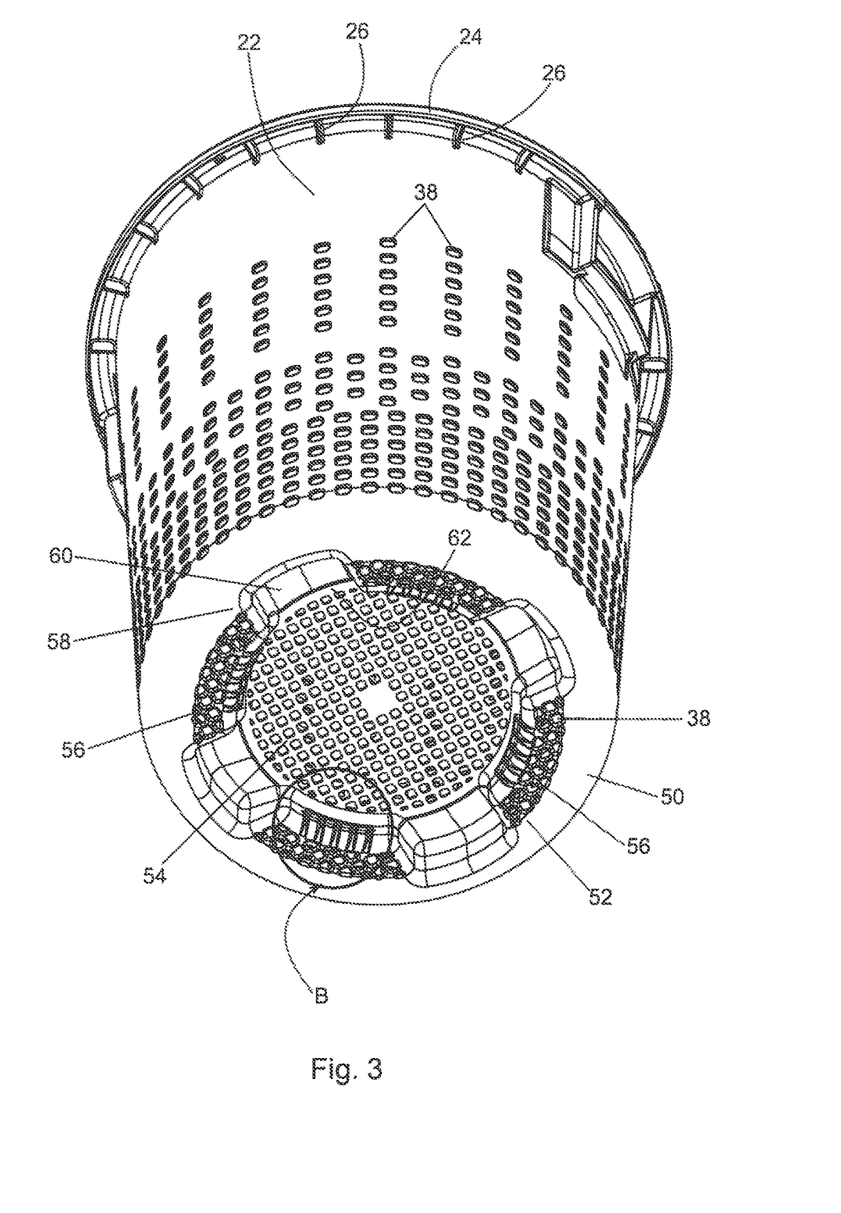
FIG. 3 shows a bottom perspective view of the removable bin of FIG. 2.
Figure 5:
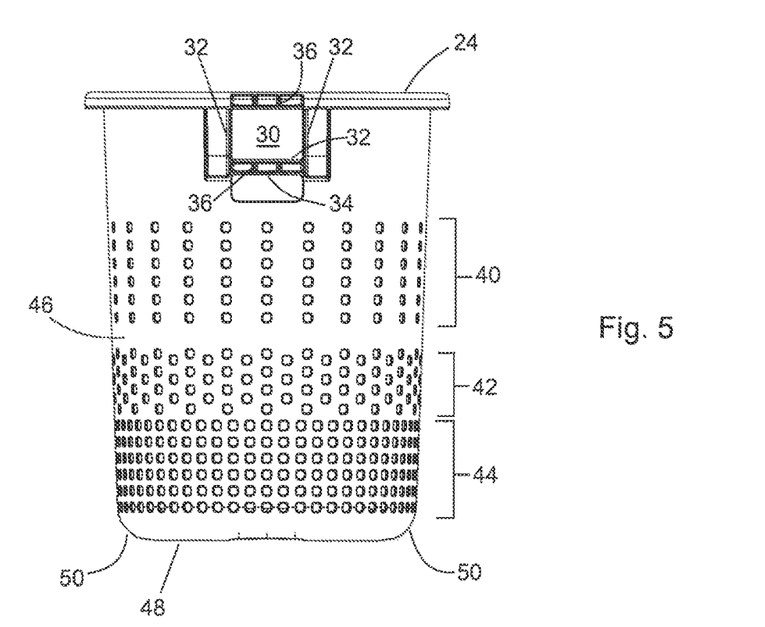
FIG. 5 shows a second side view of the removable bin of FIG. 2.

Referring to FIGS. 2, 3, and 5, the removable bin 10 is generally cylindrical in shape. It comprises an open end 12, a wall portion 14, and a floor portion 16. The contents of the removable bin 10 may be loaded into and unloaded from the removable bin 10 through the open end 12.

Figure 4:
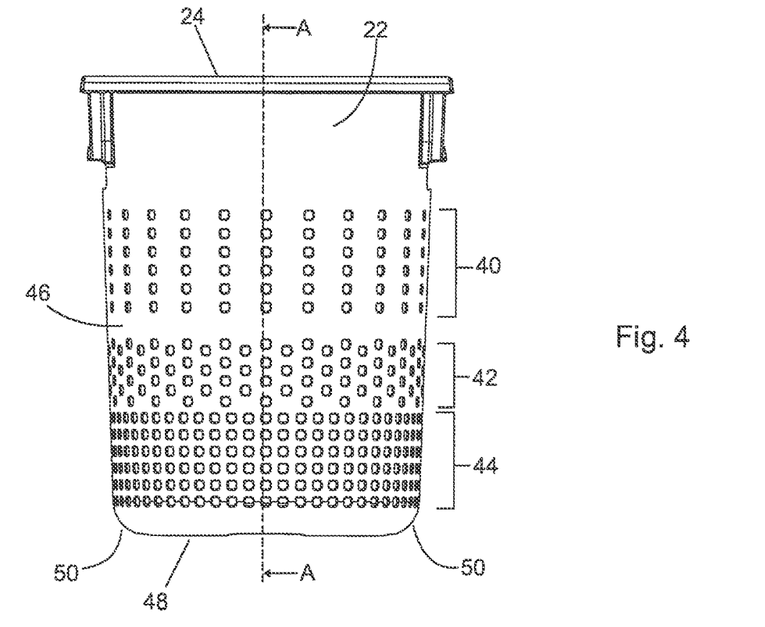
FIG. 4 shows a first side view of the removable bin of FIG. 2.

The wall portion 14 comprises an upper portion 18 and a lower portion 20. Although the removable bin 10 is generally cylindrical, the wall portion 14 is preferably slightly tapered, as best shown in FIGS. 4 and 5. As a result, the diameter of the wall portion 14 generally decreases from along the upper portion 18 through to along the lower portion 20.

Figure 11:
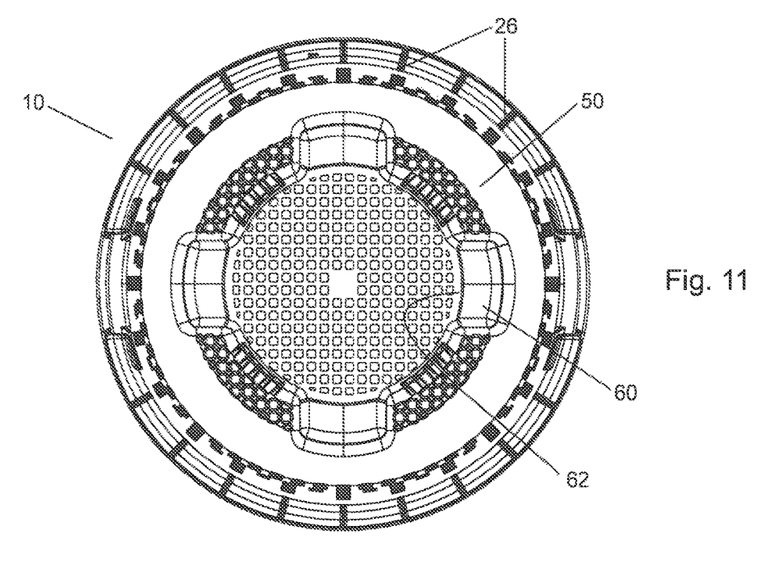
FIG. 11 is a bottom view of the removable bin of FIG. 2.

Referring to FIGS. 4 and 5, the upper portion 18 comprises an upper wall 22 and a lip 24 that runs along the upper edge of the upper wall 22. The lip 24 also generally defines the open end 12. The lip 24 preferably extends a distance away from the upper wall 22. The underside of the lip 24 preferably comprises one or more lip cross-ribs 26 (as best shown in FIGS. 3 and 11) attached to the lip 24 and extending radially from the upper wall 22. The lip cross-ribs 26 provide additional strength to the lip 24 and to the upper portion 18 generally.

The upper portion 18 further comprises one or more handles 28. In the embodiment shown in FIGS. 2 and 3, the upper portion 18 comprises two handles 28 arranged diametrically across from one another; however, it is understood that other number of handles 28 and other arrangements are also possible. The handles 28 each comprise a handle opening 30 that is defined, at least in part, by one or more handle walls 32. The handle opening 30 allows for the partial insertion of the user's fingers. In the embodiment shown in FIG. 5, the handle walls 32 define the side and lower boundaries of the handle opening 30, with the upper boundary of the handle opening 30 defined by the lip 24. However, it is understood that the upper boundary of the handle opening 30 may instead by defined by a separate handle wall 32.

Figure 10:
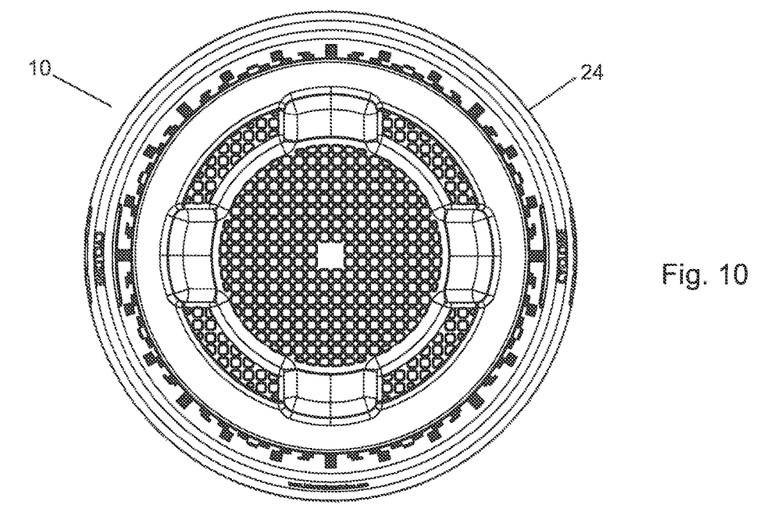
FIG. 10 is a top view of the removable bin of FIG. 2.

The handle walls 32 generally extend a distance away from the upper wall 22; however, this distance is preferably equal to or less than the distance that the lip 24 extends away from the upper wall 22. In other words, the handle walls 32 lie at or within the outer perimeter of the lip 24. Therefore, referring to FIG. 10, when the removable bin 10 is viewed from above, the handle walls 32 are not visible.

Additional handle support walls 34 and handle support ribs 36 may also be used to increase the strength of the handles 28. For example, in the embodiment shown in FIG. 5, a handle support wall 34 and a number of handle support ribs 36 are located proximate to the bottom of the handle opening 30. In addition, a number of handle support ribs 36 are also located within the lip 24 proximate to the top of the handle opening 30. Preferably, the handle support ribs 36 extend away from the upper wall 22 and are located proximate to the handle opening 30. Each of the handle support walls 34 is preferably attached to at least one of the handle support ribs 36.

The lower portion 20 comprises a plurality of openings 38 for drainage that permit water to escape from the removable bin 10 when the food dryer 200 is in operation. The openings 38 are arranged in a plurality of patterns along the height of the lower portion 20. In the embodiment shown in FIGS. 4 and 5, the openings 38 are arranged in three distinct zones 40, 42, 44 extending around the lower portion 20, with each of the zones 40, 42, 44 comprising a different pattern of openings 38. The first zone 40 is located proximate to the top of the lower portion 20, the third zone 44 is located proximate to the bottom of the lower portion 20, and the second zone 42 is located in between the first zone 40 and the third zone 44. Preferably, the pattern of openings 38 in each of the zones 40, 42, 44 is such that the density of openings 38 (i.e. the number of openings 38 in an area of a given zone) in each of the zones 40, 42, 44 increases as one moves towards the bottom of the lower portion 20. This is best shown in FIG. 4, where the openings 38 in the first zone 40 are spaced further apart from those in the second zone 42, which in turn are spaced further apart from those in the third zone 44. For example, in the embodiment shown in FIG. 4, the number of openings in the third zone 44 is approximately double that of the first zone 40.

Although the embodiment in FIGS. 4 and 5 shows three distinct zones 40, 42, 44, it is understood that any number of zones may be used (i.e. two zones or greater than three zones). Preferably, the density of openings 38 increases as one moves towards the bottom of the lower portion 20. In other words, there are preferably more openings 38 at the bottom of the lower portion 20 relative to the top of the lower portion 20. The zones located towards the bottom of the lower portion 20 would preferably have a higher density of openings 38 than those located towards the top of the lower portion 20.

The embodiment in FIGS. 4 and 5 shows the openings 38 within each of the zones 40, 42, 44 to be arranged in a regular or semi-regular pattern, it is understood that this is not necessary. However, as discussed above, the relative densities of the openings 38 are such that the density preferably increases as one moves towards the bottom of the lower portion 20.

As the removable bin 10 is rotated within the food dryer 200, centrifugal force and gravity tend to cause the water present on the contents to generally move both outwardly (i.e. away from the center of the removable bin 10 and toward the wall portion 14) and downwardly (i.e. toward the floor portion 16). Because of this general downward movement of the water, it is expected that more water will tend to escape through towards the bottom of the wall portion 14 compared to the top of the wall portion 14. Consequently, the additional density of openings 38 proximate to the bottom of the lower portion 20 will allow for the more efficient escape of water from the removable bin 10.

Referring back to FIGS. 4 and 5, the lower portion 20 preferably comprises a band 46 extending around the lower portion 20 that does not have any openings 38. The location of the band 46 corresponds to the general location on the removable bin 10 that comes into contact with the metal basket 204 (e.g. where the removable bin 10 comes into contact with the basket rim 206). In the embodiment shown in FIGS. 4 and 5, the band 46 is located between the first zone 40 and the second zone 42; however, it is understood that the band 46 could also be located within a zone, depending on the layout of the zones and on the area of contact with the metal basket 204. Since the band 46 does not have any openings 38, this provides some additional strengthening for the removable bin 10 in the area of contact.

The floor portion 16 comprises a base 48 connected to the lower portion 20 through a rounded corner 50. The rounded corner 50 helps to make the removable bin 10 more comfortable when placed on the shoulder of a person carrying the removable bin 10. In such a scenario, the rounded corner 50 is more comfortable on the shoulder of the person (i.e. compared to a bin with sharp corners). In addition, the rounded corner 50 allows for easier cleaning of the bottom of the removable bin 10 as there are fewer sharp crevices to trap dirt.

Figure 9:
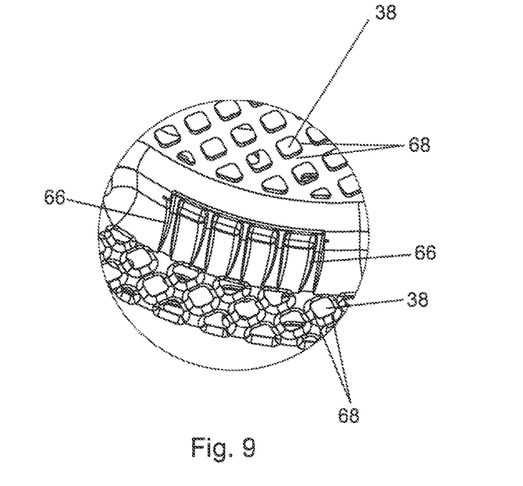
FIG. 9 shows a magnified view of the portion of FIG. 3 identified as B.

Referring to FIG. 11, the base 48 comprises an outer portion 52 generally surrounding an inner floor 54. The outer portion 52 comprises two or more outer floors 56 and two or more base handles 58. In the embodiment shown in FIGS. 9 and 11, the base 48 comprises four base handles 58 arranged approximately 90° from one another; however, it is understood that other number of base handles 58 and arrangements are also possible. In the embodiment shown in FIG. 11, the outer floors 56 extend between the various base handles 58. Preferably, the outer floors 56 comprise a plurality of openings 38 to permit the escape of water from the removable bin 10. The base handles 58 preferably comprises one or more base handle walls 60 arranged to provide base handle recesses 62 that allow the partial insertion of a user's fingers.

Figure 6:
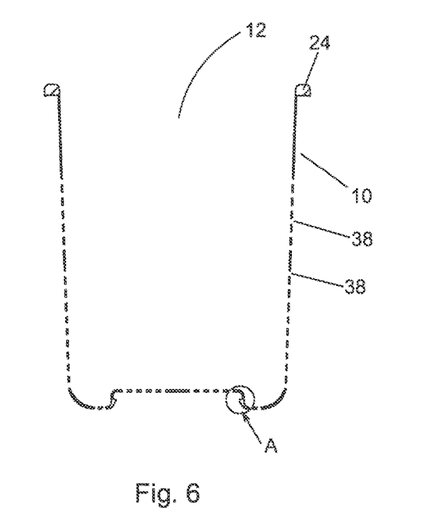
FIG. 6 shows a partial cross-sectional view of the removable bin of FIG. 2 taken along line A-A of FIG. 4.
Figure 8:
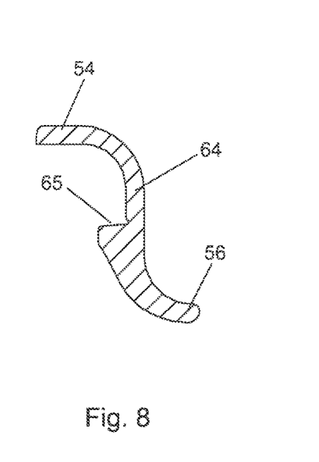
FIG. 8 shows a magnified view of the portion of FIG. 6 identified as A.

The inner floor 54 is preferably vertically offset from the outer portion 52. For example, in the embodiment shown in FIG. 11, the inner floor 54 is elevated with respect to the outer portion 52 (as best shown in FIGS. 6 to 8). Referring to FIG. 8, one or more ledges 64 may extend between the outer floors 56 and the inner floor 54. In addition, a ridge 65 may extend inwardly (i.e. towards the center) from one or more of the ledges 64. The inner floor 54 preferably comprises a plurality of openings 38 to permit the escape of water from the removable bin 10. One or more ledge ribs 66 are preferably formed on and attached to the ledges 64 to increase the strength of the ledges 64.

When the removable bin 10 is placed within the metal basket 204 of the food dryer 200, the inner floor 54 of the removable bin 10 comes into contact with two semi-circular discs 214 that are connected together using one or more springs 216. As the semi-circular discs 214 are rotated, centrifugal force causes the semi-circular discs 214 to move away from each other, while stretching the springs 216. As the semi-circular discs 214 move apart, they eventually come into contact with the ledge 64. Centrifugal force causes the semi-circular discs 214 to exert pressure on the ledge 64, creating a gripping force on the ledge 64. This gripping force in turns causes the removable bin 10 to rotate with the semicircular discs 214.

As the semi-circular discs 214 exert significant pressure on the ledge 64, the ledge ribs 66 help to provide additional strength to the ledge 64. In addition, when the semi-circular discs 214 are engaged against the ledge 64, the presence of the ridge 65 also helps to prevents the removable bin 10 from moving vertically (i.e. out of the metal basket 204).

At least a portion of the removable bin 10 may be molded. Preferably, the entire removable bin 10 is molded from plastic. As such, the openings 38 are preferably formed during the molding process, with one or more circumferential edges 68 defining each of the openings 38. The circumferential edges 68 are preferably molded. The openings 38 are preferably rounded but may be of any suitable shape. As such, the circumferential edges 68 are not necessarily circular in shape.

Figure 12:
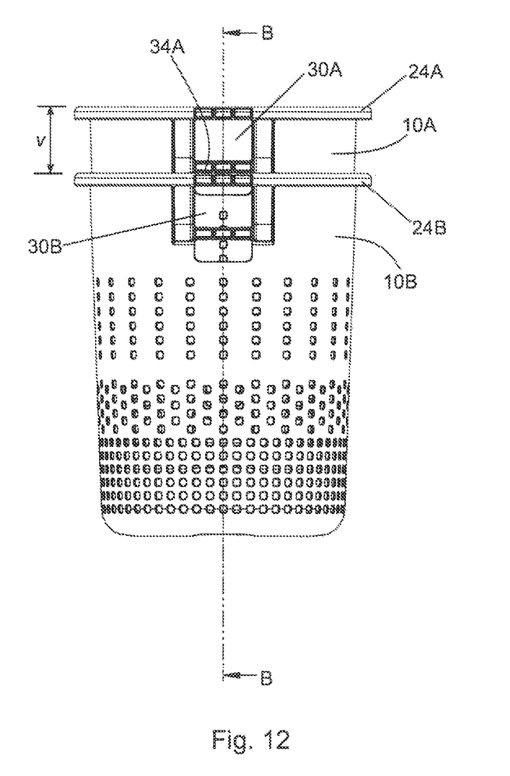
FIG. 12 is a side view showing two removable bins.
Figure 13:
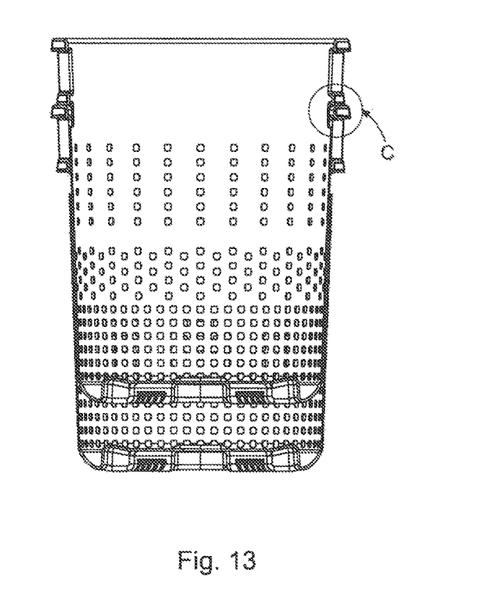
FIG. 13 is a cross-sectional view of two removable bins taken along line B-B of FIG. 12.
Figure 14:
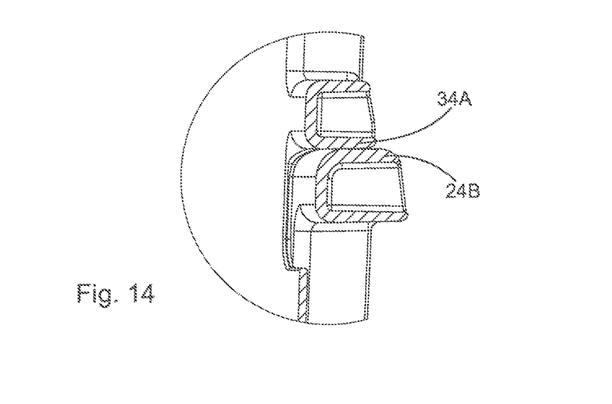
FIG. 14 is a magnified view of the portion of FIG. 13 identified as C.

Referring to FIGS. 12 to 17, two removable bins 10A, 10B may be nested together for storage. Referring specifically to FIGS. 12 and 14, when the two removable bins 10A, 10B are nested together, the handle wall support wall 34A proximate to the bottom of the handle opening 30A of removable bin 10A rests on top of the lip 24B of removable bin 10B. Preferably, the respective dimensions of the lips 24A, 24B and the handle openings 30A, 30B are such so that the distance v between the top of the lip 24A of removable bin 10A and the top of the lip 24B of removable bin 10A is approximately 5 inches. This distance is greater than when conventional bins are nested together, which is approximately 4 inches. In other words, there is greater vertical separation between the removable bins 10A, 10B, and they are not nested as tightly together as conventional bins.

Figure 15:
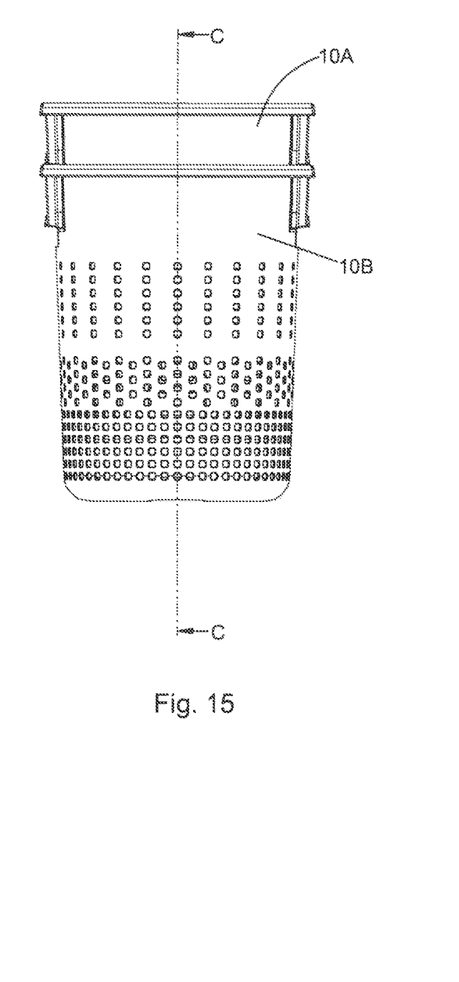
FIG. 15 is another side view showing two removable bins.
Figure 16:
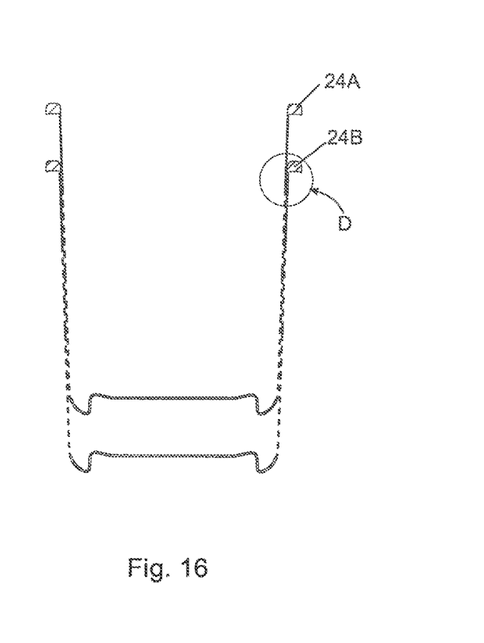
FIG. 16 is a partial cross-sectional view of two removable bins taken along line C-C of FIG. 15.
Figure 17:
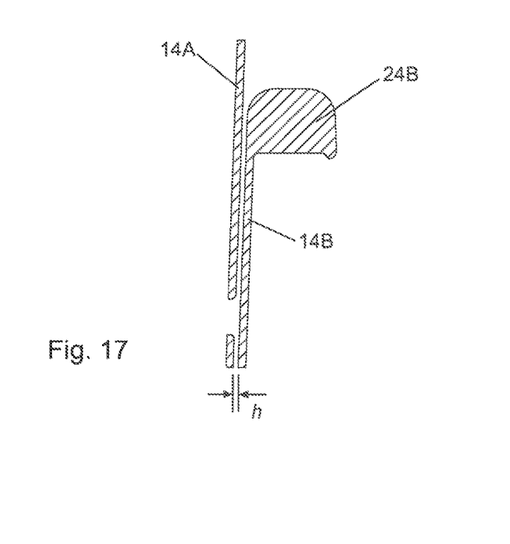
FIG. 17 is a magnified view of the portion of FIG. 16 identified as D.

Referring to FIGS. 15 and 16, as a result of this greater nesting distance, the distance between the wall portion 14A and the wall portion 14B when removable bins 10A, 10B are nested is also increased. This is because, as described above, the wall portions 14A, 14B are preferably tapered. Consequently, if the removable bins 10A, 10B are not nested as tightly together, there is greater horizontal separation between the respective wall portions 14A, 14B. Referring to FIG. 17, the horizontal separation between the wall portions 14A, 14B when removable bins 10A, 10B are nested is between approximately 1.5 mm to 2.0 mm. In comparison, when conventional bins are nested together, the horizontal separation is approximately 0.75 mm.

This increase in the horizontal separation between the respective wall portions 14A, 14B allows for the removable bins 10A, 10B to be more easily detached from one another. In particular, if a displaced piece of produce (e.g. spinach) was between the wall portions 14A, 14B, the increase in horizontal separation would result in less chance of the piece of produce being stuck between the wall portions and potentially interfering with the nesting of the removable bins 10A, 10B.

It will be appreciated by those skilled in the art that the preferred embodiment has been described in some detail but that certain modifications may be practiced without departing from the principles of the invention.

The invention claimed is:

1. A removable bin for a dryer, the bin comprising:
    a substantially circular floor portion; and
    a wall portion comprising:
        a first end and a second end, wherein the first end defines a bin opening and the second end is connected to the floor portion;
        an upper portion extending from the first end; and
        a lower portion extending between the upper portion and the second end, wherein the lower portion comprises a plurality of zones arranged along a height of the lower portion and extending along a perimeter of the lower portion and wherein each zone in the plurality of zones defines a respective area of the lower portion;
        wherein each zone in the plurality of zones comprises a number of openings for drainage and wherein each zone in the plurality of zones has a respective density of openings defined as the number of openings per the respective area;
        wherein each of the openings is defined by one or more circumferential edges, the circumferential edges being molded; and
        wherein the respective density of openings in each zone in the plurality of zones increases towards the second end.

2. The removable bin of claim 1, wherein the wall portion is tapered from the first end to the second end.

3. The removable bin of claim 1, wherein the upper portion comprises:
    an upper wall; and
    a lip extending away from the upper wall.

4. The removable bin of claim 3, wherein the upper portion further comprises one or more lip cross-ribs extending radially away from the upper wall, wherein the lip cross-ribs are attached to the lip.

5. The removable bin of claim 4, wherein the upper portion further comprises one or more handles, wherein each of the handles comprises:
    a handle opening; and
    one or more handle walls extending away from the upper wall, wherein the one or more handle walls define at least a portion of the handle opening.

6. The removable bin of claim 5, wherein the lip defines at least another portion of the handle opening.

7. The removable bin of claim 5, wherein the one or more handle walls define an entirety of the handle opening.

8. The removable bin of claim 5, wherein the lip extends away from the upper wall a first distance, and the one or more handle walls extend away from the upper wall a second distance and wherein the first distance is greater than or equal to the second distance.

9. The removable bin of claim 5, wherein the upper portion further comprises handle support ribs extending away from the upper wall and located proximate to the handle opening.

10. The removable bin of claim 9, wherein the upper portion further comprises handle support walls extending away from the upper wall, wherein each handle support wall is attached to at least one of the handle support ribs.

11. The removable bin of claim 1, wherein the lower portion comprises three zones.

12. The removable bin of claim 1, wherein the lower portion comprises a band extending along the perimeter of the lower portion and extending for a portion of the height of the lower portion, wherein the band is free of the openings.

13. The removable bin of claim 1, wherein the floor portion comprises:
    a base; and
    a rounded corner portion extending between the base and the lower portion.

14. The removable bin of claim 13, wherein the base comprises:
    an outer portion; and
    an inner floor, wherein the inner floor is substantially surrounded by the outer portion.

15. The removable bin of claim 14, wherein the outer portion comprises:
    two or more base handles; and
    two or more outer floors, wherein each of the outer floors extends between two of the base handles.

16. The removable bin of claim 15, wherein at least one of the outer floors comprises outer floor openings for drainage.

17. The removable bin of claim 15, wherein the base handles comprise one or more base handle walls to define one or more recesses.

18. The removable bin of claim 15, wherein the inner floor is vertically offset from the outer portion.

19. The removable bin of claim 18, wherein the base further comprises one or more ledges extending between the outer floors and the inner floor.

20. The removable bin of claim 19, wherein the base further comprises a ridge extending inwardly from one or more ledges.

21. The removable bin of claim 18, wherein the base further comprises one or more ledge ribs attached to one or more ledges.

22. The removable bin of claim 14, wherein the inner floor comprises one or more inner floor openings for drainage.

* * * * *